United States Patent
Domingues et al.

(10) Patent No.: US 7,371,421 B2
(45) Date of Patent: *May 13, 2008

(54) DOUGH COMPOSITION

(75) Inventors: David J. Domingues, Plymouth, MN (US); Vicky V. Hoel, Blaine, MN (US); Tammy L. McIntyre, Minneapolis, MN (US); Gregg J. Moder, Roseville, MN (US)

(73) Assignee: General Mills Marketing, Inc., Minneapolis, MN (US)

( * ) Notice: Subject to any disclaimer, the term of this patent is extended or adjusted under 35 U.S.C. 154(b) by 362 days.

This patent is subject to a terminal disclaimer.

(21) Appl. No.: 11/068,332

(22) Filed: Feb. 28, 2005

(65) Prior Publication Data

US 2005/0147714 A1    Jul. 7, 2005

Related U.S. Application Data

(62) Division of application No. 10/636,787, filed on Aug. 7, 2003, now Pat. No. 6,884,443.

(51) Int. Cl.
*A21D 10/00* (2006.01)

(52) U.S. Cl. ............... 426/10; 426/20; 426/27; 426/61; 426/62

(58) Field of Classification Search ............... None
See application file for complete search history.

(56) References Cited

U.S. PATENT DOCUMENTS

| | | | |
|---|---|---|---|
| 1,904,741 A | 4/1933 | Lorber | |
| 3,615,679 A | 10/1971 | Tangel et al. | |
| 4,005,225 A * | 1/1977 | Craig et al. | 426/21 |
| 4,374,151 A | 2/1983 | Lindstrom et al. | |
| 4,406,911 A | 9/1983 | Larson et al. | |
| 4,604,289 A * | 8/1986 | Spanier et al. | 426/19 |
| 4,947,104 A | 8/1990 | Pyke | |
| 4,966,778 A | 10/1990 | Benjamin et al. | |
| 5,094,859 A | 3/1992 | Sluimer | |
| 5,171,590 A | 12/1992 | Sluimer | |
| 5,254,351 A | 10/1993 | de Boer et al. | |
| 5,447,738 A | 9/1995 | de Bruijne et al. | |
| 5,451,417 A | 9/1995 | Freyn et al. | |
| 5,510,126 A * | 4/1996 | Van Eijk et al. | 426/19 |
| 5,560,946 A | 10/1996 | Sanders et al. | |
| 5,672,369 A | 9/1997 | Lonergan et al. | |
| 5,759,596 A | 6/1998 | Domingues et al. | |
| 5,827,724 A | 10/1998 | Gysler et al. | |
| 5,997,914 A | 12/1999 | Shimura et al. | |
| 6,579,547 B2 | 6/2003 | Niederberger et al. | |
| 6,579,554 B2 | 6/2003 | Moder et al. | |
| 6,733,803 B1 | 5/2004 | Vidkjaer | |
| 6,884,443 B2 | 4/2005 | Domingues et al. | |
| 2001/0043978 A1 * | 11/2001 | Moder et al. | 426/549 |
| 2005/0153016 A1 | 7/2005 | Domingues et al. | |

FOREIGN PATENT DOCUMENTS

WO    WO 96/35430    11/1996

* cited by examiner

*Primary Examiner*—Lien Tran
(74) *Attorney, Agent, or Firm*—Arlene L. Hornilla; Scott Pribnow

(57) ABSTRACT

Described are dough compositions and methods, wherein the dough composition is prepared using a metabolized portion of dough comprising bubbles, metabolically active yeast, and developed dough matrix, combined with non-metabolized yeast, and wherein the dough composition preferably has useful properties such as yeast-leavened freezer-to-oven capabilities, without the need for chemical leavening agents or modified atmosphere packaging.

3 Claims, No Drawings

DOUGH COMPOSITION

REFERENCE TO RELATED APPLICATIONS

This application is a divisional of U.S. patent application Ser. No. 10/636,787 filed on Aug. 7, 2003 now U.S. Pat. No. 6,884,443.

FIELD OF THE INVENTION

The invention is generally directed to compositions and methods useful for producing dough compositions and baked dough products. These include methods and compositions useful for producing "freezer-to-oven," "FTO" doughs that can be stored frozen without proofing and that can be baked without being thawed or proofed. Preferred embodiments can be packaged without modified atmosphere packaging, and do not require chemical leavening agents.

BACKGROUND

Frozen doughs are desirable for commercial and home baking because they minimize preparation time and are easy to use. Such ready-to-bake doughs should be storage stable when frozen and should provide baked products having good organoleptic qualities and aesthetic appeal. Examples of frozen doughs include those described in U.S. Pat. Nos. 4,847,104; 4,966,778; 5,447,738; 5,560,946; 5,254,351; and in PCT Application WO 96/34530.

Frozen doughs come in a variety of different product types, e.g., based on the steps required to prepare a baked product from the dough. As background, dough products can require expansion during baking, and can also require proofing, i.e., allowing the dough to sit to allow yeast to produce carbon dioxide that expands the dough prior to and during baking. Many frozen doughs operate on this principle, with yeast as a leavening agent. When using typical yeast-leavened frozen doughs, a consumer will thaw the bread out of the freezer, allow the bread to sit (i.e., proof) for a time sufficient for the bread to produce carbon dioxide that will expand during baking, and then, finally, bake the bread. The steps of thawing and proofing can be very time-consuming. When preparing these types of frozen doughs, designed for preparation by a consumer by thawing, proofing, and then baking, it is generally preferred to avoid allowing yeast to metabolize prior to freezing, to enhance storage stability and to allow substantial leavening during baking.

Other types of frozen doughs are designed to remove or reduce the amount of time a consumer spends between freezer and oven. Some frozen dough products are sold "pre-proofed," which means that the dough is allowed to rise before freezing. Pre-proofed doughs have several drawbacks. Pre-proofed doughs can be expensive because a proofing step must be performed during the manufacturing process, and, such doughs can require a significant amount of storage space. Moreover, pre-proofed doughs can be susceptible to damage by temperature fluctuations, the formation of ice crystals, and mechanical stresses.

As another alternative, some frozen doughs are not pre-proofed but include chemical leavening agents and do not require a proofing step. These dough compositions use chemical leavening agents instead of yeast. The chemical leavening agent operates differently from yeast. While yeast requires time after thawing and prior to baking, for sitting at ambient temperature to produce carbon dioxide, a chemical leavening agent produces a gas at baking temperature, during baking, to expand the dough. The dough may or may not require thawing between the freezer and oven.

Some types of frozen dough products, especially pre-proofed, yeast-leavened, frozen dough products, are sometimes sold in modified-atmosphere packaging. The packaging can include an inert gas such as nitrogen or carbon dioxide to prevent oxidation of the frozen dough and to maintain a high concentration of carbon dioxide in the frozen dough to minimize loss of carbon dioxide from the dough during storage and for expansion of the dough during baking. Modified atmosphere packaging has drawbacks such as added cost and complexity.

There is a continuing need to provide new methods and compositions useful in producing frozen dough products. Especially desirable would be methods and compositions capable of producing a frozen dough composition that can be stored frozen without first being proofed or partially baked, especially that can also provide a desirable baked dough product without being thawed or proofed after freezing and before being baked. Most preferably, either or both of these goals might desirably be met without the need for chemical leaveners or modified atmosphere packaging.

SUMMARY OF THE INVENTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Generally, the invention relates to the discovery that selection and optimizing of ingredients of a dough composition, also in combination with selection of processing steps and conditions, allows otherwise standard dough ingredients to be processed into a frozen dough composition having freezer-to-oven convenience, without the necessity for chemical leavening agents, partial baking before freezing, pre-proofing before baking, or the use of modified atmosphere packaging.

The invention involves techniques of producing a frozen dough composition that exhibits these useful properties, including: combining general dough ingredients; allowing for metabolizing of a portion of yeast of the total dough composition to produce bubbles in a developed dough matrix; maintaining the bubbles through processing to be present at baking; and allowing for the presence of non-metabolized yeast in the dough composition, especially when frozen and at baking. Allowing a portion of the total amount of yeast to metabolize produces nucleation sites, e.g., bubbles, in the dough composition. The bubbles are retained by the developed dough composition into baking, to expand during baking to leaven the dough. Yeast which has not been allowed to metabolize prior to baking is also present for metabolization and leavening upon baking. The dough, including the bubbles and non-metabolized yeast, can be directly frozen and baked without thawing. The combination of bubbles and non-metabolized yeast combine their leavening effects during baking to leaven the dough composition to a desired baked specific volume. The developed dough composition matrix can withstand freezing while maintaining the bubbles.

Specific ingredients, processing steps, and features of a dough composition that can be selected to achieve the described performance include those that will provide the following.

Ingredients to provide a strengthened or developed gluten matrix or network dough matrix that can maintain bubbles before and during freezing. Flour may contribute toward a developed matrix, and a dough composition may contain ordinary flour, high protein flour, or both, optionally with added gluten to strengthen and stabilize the dough matrix to maintain bubbles through processing and into baking, where the bubbles can be available to leaven the dough. Preferred developed dough compositions may be produced by allowing yeast to metabolize during processing, e.g., using a rest or cooling step, such as a discrete floor-time resting or cooling step, by using a pre-fermented or rested sponge for a time sufficient to develop gluten, resting or cooling time between processing of the dough composition after mixing but before freezing, such as between lamination steps, or another step that allows development of gluten; through the use of strengtheners (e.g., transglutaminase or others); or by including re-work dough composition that has been processed for a time sufficient to allow the matrix to develop.

Nucleation sites, e.g., bubbles, which contain gas that will leaven the dough composition during baking. Bubbles can be introduced in a pre-fermented sponge, in a re-work composition, or using processing steps such as mixing or post-mixing processing such as folding, laminating, lapping, or another method of incorporating gas or bubbles into a dough composition. The type and amount of yeast included in the metabolized dough portion can be selected to become metabolically active during processing to produce a useful amount of bubbles that can be retained through processing and frozen storage for leavening during baking.

An amount of non-metabolically active yeast. Yeast is included in the dough composition, at least a portion of which will remain non-metabolically active into and through frozen storage for availability during baking, to leaven the dough composition.

These inventive dough compositions can be prepared by any method or combination of steps that are identified and selected, in combination with dough ingredients, to achieve performance properties described herein. The invention identifies certain exemplary methods and compositions for preparing the described dough compositions and baked dough products. One embodiment of a method of the invention, generally stated, involves producing a pre-metabolized dough sponge that includes metabolized yeast, bubbles, and gaseous yeast metabolites (e.g., carbon dioxide) and combining the pre-fermented sponge with additional dough ingredients including non-metabolized yeast to produce a dough composition. The combined dough composition includes bubbles, metabolically active yeast, non-metabolically active yeast, and a developed dough matrix. The dough composition can optionally and preferably not be partially baked or proofed, but can be frozen and baked without intermediate steps of thawing or proofing to a yeast leavened dough product, also preferably without the need for chemical leavening agents.

A preferred dough composition sponge can include a portion of the ingredients that go into the overall dough composition, preferably including water, flour, and yeast in an amount that is only a portion of total amount yeast to be used in the dough. The sponge can be fermented or "pre-fermented" to allow the included portion of yeast to become metabolically active and produce carbon dioxide, which takes the form of bubbles and which becomes absorbed in the water. The bubbles are maintained in the dough composition and are effective later as nucleating sites for carbon dioxide and water vapor, during baking, to expand and leaven the dough composition. The pre-fermenting step also develops and strengthens the dough composition, giving viscoelastic properties that allow the sponge and dough composition to expand without breaking. After fermenting the sponge, additional dough ingredients can be added to the sponge to produce a dough composition that may be processed in any desired manner. The additional dough ingredients may include an additional portion of yeast, which is non-metabolically active. Such later-added yeast can be maintained through processing and in the frozen dough composition in a non-metabolically active state to be activated for leavening during baking. The additional ingredients can preferably be added such that the bubbles of the sponge are maintained and remain in the dough composition. The bubbles are also preferably maintained through further processing so that when the dough composition is baked, bubbles of gas cause the bread to expand as does the gas production from the previously non-metabolically active yeast.

An alternative embodiment of the invention, generally stated, involves providing (instead of a pre-fermented sponge dough composition) any different dough composition that contains dough ingredients such as flour, water, and yeast, and that also includes metabolically active yeast, a developed dough matrix, and bubbles. An example of such a dough composition is dough composition that is removed from dough processing at a point down-line from a mixing step in a commercial dough composition manufacturing system, often referred to as "recycle" or "re-work." Such dough composition includes standard dough ingredients, bubbles, carbon dioxide, metabolically active yeast, and developed dough matrix. Any other dough composition meeting this description could also be used in place of sponge or "re-work" dough. The re-work dough can be combined with additional dough ingredients to produce a dough composition that includes bubbles, metabolically active yeast, non-metabolically active yeast, and a developed dough matrix. The dough composition can optionally and preferably not be partially baked, and can be frozen and baked without intermediate steps of thawing, proofing, or partially baking, and preferably without the need for chemical leavening agents or modified atmospheric packaging.

In preferred embodiments, the invention relates to "un-proofed" freezer-to-oven ("FTO") frozen dough products, which means frozen dough products that can be baked without thawing or proofing, as well as methods and compositions useful in preparing such FTO dough products. The preferred FTO compositions can be baked without the need for one or more steps of pre-proofing the dough composition prior to freezing, partially baking the dough composition prior to freezing, thawing the frozen dough composition between freezing and baking, or proofing the dough composition between freezing and baking. The dough composition can be capable of substantial expansion upon cooking, thereby producing a cooked, yeast-leavened dough product with excellent visual and organoleptic properties. Preferably, the dough composition can be packaged and frozen in conventional packaging, which does not contain a modified atmosphere such as a concentration of inert gas or carbon dioxide.

Preferred dough compositions of the invention can be un-proofed before being frozen and before being baked and can have a raw specific volume of between about 0.9 cc/g and about 1.5 cc/g, preferably between about 1 cc/g and about 1.3 cc/g, prior to freezing.

A preferred dough composition of the invention can typically be shelf stable for between about 3 months and about 5 months at freezing temperatures.

The inventive methods and compositions, with their advantageous FTP capabilities, can be used to prepare all types of frozen dough compositions and dough-type products such as loaf bread; bread rolls; bread sticks; pizza crusts; rolls, including cinnamon rolls, sweet rolls; laminated dough products such as Danishes, croissants, etc.; filled dough products and the like.

The invention allows the production of dough compositions that exhibit one or more, most preferably all, of the following advantages: no proofing, either before or after freezing or before baking; no thaw step between freezing and baking; no modified atmosphere packaging; and freeze-thaw tolerance. Fully yeast-leavened compositions of the invention can also exhibit advantages in comparison to chemically leavened FTO dough products, because such yeast-leavened dough compositions naturally exude a yeast-leavened aroma, and because they do not suffer from lmitiation of chemically leavened products such as with taste and they also do not react until heated, unlike yeast.

In one embodiment of the present invention, a method of preparing an unproofed dough composition capable of being frozen and baked without thawing to create a yeast-leavened baked dough product is described and includes the steps of initially providing a set of ingredients including at least yeast, water, and flour; then combining and processing the ingredients in combination with additional dough ingredients to produce a dough composition, the combining and processing including the steps of allowing a portion of the yeast to actively ferment a portion of the ingredients; next developing the dough composition; then generating bubbles in the developed dough composition; providing non-metabolically active yeast in the dough composition; then finally the combination of bubbles, developed dough composition, and non-metabolically active yeast, results in an unproofed dough composition capable of being frozen without partially baking, and baked without thawing, to create a yeast-leavened baked dough product.

In a still further embodiment of the present invention, a method of making an unproofed dough composition is described and includes the steps of initially providing a metabolized dough portion comprising metabolically-active yeast, bubbles, and developed dough matrix; then combining the metabolized dough portion with additional dough ingredients including non-metabolically active yeast, to form a dough composition that contains bubbles in developed dough matrix, and that contains non-metabolically active yeast. The unproofed dough composition produced in accordance with the above method can be frozen and baked without thawing or proofing to produce a yeast-leavened baked dough product.

In yet a still further embodiment, a frozen unproofed dough product is described and includes a dough composition, having a portion of metabolized dough composition that includes water, flour, metabolically-activated yeast, bubbles, and developed dough composition matrix. The dough composition is then combined with additional dough ingredients that include non-metabolically-active yeast. The dough composition is packaged in non-modified atmosphere packaging. The unproofed dough composition of the present invention can be baked without thawing to produce a yeast-leavened baked dough product.

A laminated dough composition is also described that includes alternating dough composition layers and shortening layers, wherein the dough composition layers include transglutaminase.

A method of making a laminated dough composition is described and includes the steps of initially providing a dough composition comprising water, flour, yeast, and transglutaminase, and then processing the dough composition by lapping the dough composition to form multiple layers of dough composition and shortening to provide a developed dough matrix.

An unproofed dough composition is also depicted in other embodiments of the present invention and includes an amount of metabolically active yeast, an amount of non-metabolically active yeast, bubbles, and a developed dough matrix. The combination of bubbles, developed dough matrix, and non-metabolically active yeast result in an unproofed dough composition capable of being frozen and baked without thawing to a yeast-leavened baked dough product.

A still further exemplary embodiment of the present invention relates to a continuous method of preparing an unproofed dough composition that can be frozen and then baked without thawing to produce a yeast-leavened baked dough product which includes the steps of initially providing a dough sponge comprising water, flour, yeast, and yeast nutrient; then pre-fermenting the dough sponge to produce a pre-metabolized dough sponge comprising metabolically active yeast and bubbles in a strengthened sponge matrix. Next, the pre-fermented sponge is combined with additional dough ingredients including non-metabolically active yeast. The dough composition is processed to create a dough composition comprising metabolically active yeast, bubbles, non-metabolically active yeast, and a developed dough matrix, which can be frozen and then baked without thawing to a yeast-leavened baked dough product, wherein the processing produces re-work dough removed from the dough composition, the re-work dough comprising metabolically-active yeast, bubbles, and a developed dough matrix. Finally, the re-work dough with the dough composition at a processing step upstream from where the re-work dough was removed, to produce a dough composition comprising metabolically active yeast, bubbles, non-metabolically active yeast, and a developed dough matrix, wherein that combined dough composition comprising the re-work dough can be frozen and then baked without thawing to produce a yeast-leavened baked dough product.

As used herein, the following terms represent the given meanings.

"Dough sponge" or "sponge" means a composition containing at least water, flour, yeast, and optionally yeast nutrient and optional gluten, and optionally other dough ingredients such as sugar, salt, shortening, flavorings, etc., particularly when the ingredients are combined in amounts having significantly more water than a standard dough composition.

"Ferment" or "metabolize" means to produce or allow changes in a dough composition or sponge brought about by the metabolic action of yeast enzymes that function to produce metabolites such as carbon dioxide, ethanol, etc., in a dough composition or sponge, and also to develop the dough composition or dough composition sponge; "pre-ferment" is used specifically to refer to fermenting a dough sponge.

"Proofing" refers to a (generally final) step before baking or freezing a dough composition, wherein a dough composition is given time to allow yeast to metabolize and produce gaseous metabolites, generally including carbon dioxide, that will expand the dough composition to a desired volume and optionally to a desired shape.

"Yeast-leavened" refers to dough compositions that are leavened primarily due to the production of gaseous metabolites by yeast; chemical leavening agents may be present, but in a minor amounts, preferably less than 10 percent by weight chemical leavening agent based on the total weight of leavening agent (yeast and chemical leavening agent) or may not be present at all. As used herein with respect to the invention, yeast-leavened refers also to a dough product that is leavened to a degree that is understood to be useful for typical and standard leavened dough products, for example to a baked specific volume of at least 2 or 2.5 cubic centimeters per gram (cc/g), preferably up to 4 or 5 or 6 cc/g, or even a higher baked specific volume.

"Chemical leavening agent" or "CLA" is used consistently with the understood meaning of the term in the dough and baking arts; the term refers to chemical materials used as alternatives to yeast leavening agents for leavening dough products, generally by reaction of two complementary ingredients, e.g., an acid and a complementary base, to produce a gaseous reaction product that leavens a dough product; the term does not include compounds such as water, carbon dioxide, or ethanol, otherwise normally present in yeast-leavened dough compositions or produced as yeast metabolites.

These, as well as other objects and advantages of this invention, will be more completely understood and appreciated by referring to the following more detailed description of the presently preferred exemplary embodiments of the invention.

DETAILED DESCRIPTION

The present invention is now illustrated in greater detail by way of the following detailed description, but it should be understood that the present invention is not to be construed as being limited thereto.

Dough compositions of the invention can be prepared by selecting ingredients (including ingredient compositions and amounts) and processing techniques used to prepare a dough composition, to produce a frozen dough composition that has convenient qualities such as one or more of "freezer-to-oven" capabilities and freeze-thaw stability, preferably without the need for pre-proofing, partially baking, chemical leavening agents, or modified atmosphere packaging.

The invention specifically involves techniques of producing a frozen dough composition that include: combining select dough ingredients; allowing for metabolization by a portion of yeast in a dough composition, to provide bubbles and a developed dough matrix; processing to allow the bubbles to be maintained in the dough composition throughout subsequent processing steps and to freezing and baking; and providing or allowing for the presence of yeast that are not metabolically active (during freezing and baking). Metabolizing activity by an the total amount of yeast of a dough composition produces nucleation sites, e.g., bubbles, in a dough composition and a developed dough matrix. The bubbles are maintained by the developed dough matrix during processing and are available to expand during baking to leaven the dough. Non-metabolizing yeast is also present for metabolization during baking and an additional contribution to leavening. The dough, including the bubbles and non-metabolizing yeast, can be directly frozen and baked without thawing.

The dough composition can be produced by providing a portion of dough composition that contains metabolizing yeast (a "metabolized dough" composition or "portion") and combining that metabolized portion with additional ingredients including non-metabolizing yeast.

The metabolized dough composition contains dough ingredients such as flour, water, sugar, yeast, optional gluten, and optional yeast food, and is processed to produce bubbles, metabolically active and yeast metabolites, and a strengthened or developed dough matrix.

Bubbles can be produced in a metabolized dough portion by yeast metabolites such as carbon dioxide forming in the dough matrix. Bubbles can also be produced by processing steps including mixing, lapping, sheeting, or other steps that entrap gas in a dough composition.

A "developed" dough or dough matrix refers to a dough or dough sponge composition or matrix, etc., with a woven alignment of gluten protein strands. A developed dough according to the invention can maintain bubbles in a dough portion, matrix, or composition, etc., through mixing and subsequent processing and into baking, where the bubbles can be available to leaven the dough composition. Ingredients used to provide a developed dough composition include flour, optionally high protein flour, and an optional strengthener e.g., gluten, transglutaminase, and others. Flour to contribute toward a developed matrix may be ordinary flour, high protein flour, or a combination of these. A developed dough composition can be produced by known methods that align protein molecules and allow a strengthening reaction between dough ingredients. Protein molecule alignment can occur during mixing steps or subsequent handling. Strengthening reactions can occur by allowing yeast to metabolize, e.g., during processing using a rest or cooling step, e.g., as occurs in a dough composition sponge that is pre-fermented or rested for a time sufficient to develop gluten, as is occurs in a re-work dough composition that has been processed for a time sufficient to allow the dough composition to develop, or can occur during other processing steps, resting steps, or floor time. Developing a dough composition can also be facilitated and accomplished by use of a strengthener, including gluten, transglutaminase and others known and available in the dough and baking arts such as chemical and enzymatic oxidants such as azodicarbonamide and glucose oxidase.

As is discussed in more detail below, two examples of metabolized dough portions include dough composition sponge and re-work dough composition.

Sponge Composition as Metabolized Portion

One important embodiment of the invention relates to methods and compositions involving a metabolized portion of dough composition in the form of a dough composition sponge ("sponge"). In general, according to this embodiment, dough compositions of the invention can be prepared by providing a pre-fermented sponge and adding additional dough ingredients to that sponge, including non-metabolically active yeast. A liquid pre-ferment step, i.e., a step of pre-fermenting certain dough ingredients in the form of a sponge, can provide a sponge comprising a well developed, extensible sponge matrix containing water, flour, and a portion of the yeast to be used in the overall dough composition. That portion of yeast is metabolically active during the pre-fermenting step and produces bubbles of carbon dioxide. The sponge takes the form of a developed sponge matrix being interrupted by a large amount of very small bubbles containing carbon dioxide and water vapor. Upon combining this sponge with the balance of dough ingredients, the bubbles, stabilized by the developed gluten, are effectively maintained into the finished dough composition. Non-metabolically active yeast is added, at least a portion of which does not become metabolically active until later, during baking. During baking, the portion of the yeast that was not metabolically active becomes metabolically active to produce metabolites including carbon dioxide. The bubbles serve as nucleating sites for carbon dioxide and water vapor expansion during baking. This produces expansion without the need for proofing. A strengthener such as gluten, included in a relatively high amount (3 to 6% by weight) in the dough composition, can strengthen the dough composition matrix and enhance the gas holding capacity of the dough. Also, a relatively high amount of yeast (4 to 6% by weight) in the dough composition can produce large amounts of bubbles for nucleation and can contribute to carbon dioxide saturation during processing and oven spring upon baking.

A dough sponge can be prepared by combining ingredients including at least flour, yeast, and water, and optionally other ingredients such as gluten and a yeast nutrient. These ingredients are combined in an acceptable manner to produce a sponge.

Preferably, the sponge can include a grain constituent (e.g., flour) that contributes to the structure of the sponge and ultimately to the structures of the dough composition and baked dough product. Wheat flour is a grain constituent that is frequently used in baked goods. Suitable flours include hard wheat winter and spring flours with protein ranges of from about 10 weight percent to about 16 weight percent protein, based on the weight of the flour. A high protein flour (containing between about 12 and about 16 weight percent protein) can be preferred, because proteins facilitate conditioning and strengthening of the sponge. Although less preferred, soft wheat flour or lower protein flours can also be used.

The sponge typically includes an amount of flour effective to provide desired sponge structure and consistency, i.e., structure and consistency that allow for fermentation of yeast, expansion of the sponge, and formation and retention of bubbles. The amount of flour should not be so great that the sponge is dry and loses its ability to expand. Yet the amount of flour should not be so low that the sponge has little strength or cohesive property, or does not have an ability to maintain a desired form, e.g., maintain bubbles formed within a sponge matrix, or a desired shape. Exemplary amounts of flour in a sponge composition can be in amounts in the range between about 36 weight percent and about 56 weight percent flour based on the weight of the sponge, preferably between about 41 weight percent and about 51 weight percent, and more preferably between about 43 weight percent and about 48 weight percent. These amounts are based on flour having about 13 weight percent to about 15 weight percent moisture, about 12 weight percent to about 14 weight percent wheat protein, and about 0.4 weight percent to about 0.6 weight percent ash based on the amount of flour. One of ordinary skill having read this specification will understand that amounts of flour suitable for use with such a sponge can vary depending on characteristics of the flour used, as well as the amounts and types of other ingredients, e.g., the amount and properties of gluten or strengthener in the sponge.

Yeast is included in the sponge to produce metabolites, especially gaseous metabolites such as carbon dioxide. The amount of yeast can be included in the sponge can be an amount that will produce a desired volume of metabolites which will in turn cause the sponge to produce bubbles and to develop and strengthen especially an amount sufficient to also cause carbon dioxide to be absorbed by water in the sponge, most preferably to saturate the water with carbon dioxide. The amount of yeast included in a sponge is preferably a portion of the total amount of yeast that will be included in the dough composition, i.e., some amount of yeast is added in later processing.

Preferably, the portion of yeast added to the sponge can be in the range from about 0.75 to about 1.75 percent of the total yeast included in the dough composition, more preferably from about 1 to about 1.5 percent of the total yeast used in the dough composition. Stated differently, and while amounts outside of these exemplary ranges may also be useful, this can mean that the sponge contains from about 2.8 to about 6.6 weight percent yeast based on the total weight of the sponge, preferably from about 3.8 to about 5.7 weight percent yeast based on the weight of the sponge; these amounts have been found to be useful for dough compositions (prepared from the sponge) that include from about 5 to about 7 weight percent yeast, e.g., about 6 weight percent yeast, based on the total weight of the overall dough composition.

The preferred type of yeast for the present invention is compressed yeast as opposed to active dried yeast which may produce less than satisfactory results. Compressed yeast has abouve 30% solids and is formed by pressing creamed yeast.

A yeast nutrient can optionally be included in the sponge, but is not required. A yeast nutrient can be a nutrient that is useful with a particular yeast, whereby the yeast and its enzymes can metabolize the nutrient to produce metabolites, especially carbon dioxide, and often other metabolites such as ethanol. Yeast nutrient is not required because many flours include sufficient amounts of materials that act as nutrients to allow the yeast to effectively metabolize without addition of separate nutrient. A single example of useful yeast nutrient is a class of sugars generally known to act as yeast nutrients, including dextrose.

The amount of yeast nutrient included in a sponge can be any amount that is useful for the amount of yeast, to produce a desired amount of metabolites, as will be understood by a skilled artisan. Examples of preferred amounts of yeast nutrient, such as dextrose, in a sponge can be at least about 3 weight percent based on the weight of the sponge including the range from about 2 to about 4 weight percent yeast nutrient (dextrose), based on the weight of the sponge.

The sponge can include a strengthener such as a protein-based strengthener, e.g., gluten, or transglutaminase, or other known strengtheners, for increasing the strength and extensibility of the sponge. (See the more detailed discussion of strengtheners, infra, "Additional Dough Ingredients.") The use of a strengthener can increase the gas-holding capacity of the sponge by allowing the sponge to expand instead of breaking upon evolution of carbon dioxide by the yeast; i.e., the strengthener can provide desirable viscoelastic properties. Various types of strengtheners may be used, as will be understood by a skilled artisan, with a preferred strengthener being gluten, especially vital wheat gluten, and another preferred strengthener for certain embodiments of the invention being transglutaminase.

Generally, a useful amount of gluten can be any amount that will strengthen the dough, with preferred amounts being in the range from at least about 3 weight percent of the dough, preferably at least 5 weight percent of the dough, e.g., from about 4- to about 6 weight percent of the sponge.

Generally, a useful amount of transglutaminase as a strengthener can be any amount that will strengthen the sponge.

The sponge includes liquid water in an amount that, with the other ingredients, will produce a sponge having useful properties of a sponge, including useful structure and consistency, i.e., structure and consistency that allow for fermentation of yeast, expansion, and formation and retention of bubbles. The amount of water in any particular sponge composition should be an amount that wets out the ingredients and provides a sponge having sufficient strength and cohesion to maintain bubbles formed upon evolution of gaseous metabolites such as carbon dioxide, e.g., in a closed cell structure of a sponge matrix containing bubbles of carbon dioxide.

The sponge may include other optional ingredients, as will be understood by the skilled artisan, including amounts of flavoring, sugar, shortening (oil or plastic), water-binding agent, or additives or preservatives, as discussed elsewhere in this disclosure. These ingredients can be included in the sponge composition in amounts that will produce a sponge as described above.

Exemplary Sponge Ingredients

| INGREDIENT | USEFUL | PREFERRED | MORE PREFERRED |
| --- | --- | --- | --- |
| Flour | 30-55 | 35-50 | 40-45 |
| Water | 30-55 | 35-50 | 40-45 |
| Yeast | 2.8-6.6 | 3-6.4 | 3.8-5.7 |
| Yeast nutrient (dextrose) | 0-5 | 2-5 | 3-4 |

WEIGHT PERCENT

The ingredients of a sponge can be combined in any useful manner that allows the sponge to be produced and processed to contain bubbles and a developed dough matrix. According to the invention, a sponge pre-ferment step can be performed to produce a dough product that is sufficiently developed, and contains sufficient carbon dioxide and nucleating sites, so that the sponge can be combined with other dough ingredients to form a dough composition that can be frozen, preferably without being partially baked, or proofed, and can then be baked directly without either a thawing or a proofing step, to produce a baked dough product, also preferably without the need for chemical leavening agents or modified atmosphere packaging.

Conventional and known methods of preparing sponges will be useful, such as ordinary dough mixing. Equipment useful for mixing the ingredients will be readily understood and is commercially available. The order and timing of addition of the different ingredients is to add dough ingredients to the sponge.

As one exemplary set of steps that can be useful to prepare a sponge, water (e.g., at a temperature of between about 60° F. and about 65° F.) and yeast can be mixed until the yeast substantially dissolves. The water plus yeast is added to the flour is, and the mixture is mixed until the flour is hydrated and a homogenous sponge mixture is obtained.

The sponge can be fermented, or "pre-fermented" by maintaining the sponge at conditions effective to cause yeast fermentation, typically while the sponge is maintained in a stationary and still position. The sponge can be fermented such that the sponge ingredients work together to produce yeast metabolites such as gaseous carbon dioxide, and others such as ethanol, thereby creating a highly bubbled and developed gluten sponge that can be subsequently processed into a dough composition as described herein.

The temperature and timing of the pre-ferment step can be any that will produce a useful amount of yeast metabolite, especially to strengthen the dough composition and to form bubbles containing carbon dioxide (and preferably water) and to produce carbon dioxide absorbed in the water of the sponge. Preferred pre-ferment step temperatures can be in the range from about 50 to 100 F, more preferably from about 70 to about 80 F. In some embodiments, the sponge can be left at room temperature for between about 1 to about 3 hours, preferably from about 1.5 to about 1.75 hours.

The pH of the sponge during pre-fermenting may have an affect on the amount of carbon dioxide produced. While any pH that will produce a useful amount of carbon dioxide can be effective, the solubility of carbon dioxide in water may decrease as pH falls below about 6, so a pH in excess of 6 can be preferred, e.g., a pH in the range from about 6 to about 7.

Also, it can be preferred to control, e.g., minimize, volumetric expansion of a sponge during pre-fermentation. It can be preferred to produce and maintain a maximum of closed-cell structure in the sponge. A closed cell structure prevents migration of carbon dioxide throughout the sponge, and keeps bubble size small. Carbon dioxide can diffuse more rapidly through an open cell sponge structure compared to a closed-cell structure. Controlling volumetric expansion can prevent some amount of cell structure breakdown from closed-cell to open cell structures. Additionally, proofed open-cell frozen dough compositions tend to form large ice crystals over time, which in turn can dehydrate the gluten and render the dough composition less extensible.

A goal of fermenting the sponge can be to produce a sponge with a high concentration of carbon dioxide, including gaseous carbon dioxide and carbon dioxide dissolved in water, and wherein the sponge also has a highly developed sponge matrix that will exhibit high viscoelasticity and therefore also exhibit a strong capacity to retain gaseous carbon dioxide in the form of bubbles. Additional ingredients are subsequently added to the sponge and processed to produce a dough composition. According to the invention, the bubbles and carbon dioxide present in the sponge can be maintained through the production of a dough composition by addition of more dough ingredients and by subsequent processing. This means that a substantial amount, preferably a majority of, the bubbles and carbon dioxide in the sponge can also be present in the final (e.g., frozen) dough composition produced from the sponge. The carbon dioxide and bubbles later contribute to expansion of the dough composition during baking and increase the baked specific volume of the baked dough product. Overall, the production of carbon dioxide in the described form and amounts in the sponge, by pre-fermentation, in combination with the subsequent addition of non-metabolically active yeast, can eliminate the need for a proofing step prior to freezing or baking, because carbon dioxide formed bubbles in the sponge remain present through subsequent processing to the final dough composition, and the dissolved carbon dioxide (in combination with non-metabolically active yeast) and steam generated upon heating will be present during baking in amounts sufficient to expand the dough composition without prior proofing, and preferably without the need for chemical leavening agents.

Re-Work Dough Composition as the Metabolized Portion

Another important embodiment of the invention relates to methods and compositions involving a metabolized portion of dough that is in the form of recycled or "re-work" dough.

A "recycled" or "re-work" dough composition refers to a dough composition that has been at least partially processed through a dough composition processing line, e.g., mixed, sheeted, laminated or lapped, cut, etc., and then removed from the processing line, e.g., cut away during shaping or removed due to mis-processing, normally prior to combining the dough composition with non-dough ingredients such as fillings or frostings. The re-work can be re-introduced into a dough composition of a same or similar formulation at an earlier stage of processing from where it was removed. Generally, recycling or re-working dough is a way to reduce waste or improve flavor of a final dough product. As an example, waste dough composition can be removed from a processing line, e.g., cutting station, and re-inserted into the same processing line at an earlier stage of processing, typically at a sheeting station. The re-work dough composition normally will contain substantially complete dough ingredients (e.g., it is not a "sponge"), and, will include a portion of metabolically active yeast and therefore developed dough composition matrix and bubbles.

Re-work dough composition is typically, according to standard practice, re-added to a dough composition at the sheeting processing step and is not typically added during mixing of the dough composition. This is for ease handling and processing the rework. Also, normally, the use of re-work is not designed to incorporate bubbles of the re-work composition into a dough composition, as described according to the present invention. Flavor and lessening of waste is the standard practice priority. Preferably, according to the invention, the re-work is combined with other dough ingredients, i.e., dough composition, so that the bubbles are retained by the combined re-work and dough composition. This can be accomplished, for example, by adding the rework during mixing, so that the gas cells (bubbles) get incorporated throughout the dough, and are maintained as bubbles in the developed matrix of the re-work portion.

Re-work dough can be used as a metabolized portion of dough, as described above, because, similar to a dough sponge, a re-work dough includes an amount of metabolically active yeast and therefore carbon dioxide and bubbles (typically smaller than the bubbles of a sponge), and developed dough composition matrix.

In general, according to this embodiment, dough compositions of the invention can be prepared by providing a portion of re-work dough composition and adding additional dough ingredients, including non-metabolically active yeast, to that re-work portion. (Here, the ingredients of the re-work are identical to the ingredients of the dough composition from which the re-work was removed, and the "added dough ingredients" that are added to the re-work will be the same dough composition, but at an earlier stage in processing.) A re-work composition generally includes all ingredients of the dough composition, and because it has been at least partially processed over a period of time, comprises a well-developed, extensible sponge matrix containing bubbles, carbon dioxide, and metabolically-activated yeast. Upon combining the re-work portion with the balance of dough ingredients, the bubbles, stabilized by the developed gluten, can be effectively maintained into the finished dough composition. Non-metabolically active yeast is present in the combined dough composition, e.g., from the non-re-work dough composition, which does not become metabolically active until baking. During baking, the portion of yeast that was not metabolically active becomes metabolically active to produce metabolites including carbon dioxide. The bubbles that are present serve as nucleating sites for carbon dioxide and water vapor expansion during baking. This produces expansion without the need for proofing. Gluten, included in relatively high amounts in the dough composition, can strengthen the dough composition matrix and enhance the gas holding capacity of the dough. Also, a relatively high amount of yeast in the dough composition can produce a large amount of bubbles for nucleation and can contribute to carbon dioxide saturation during processing and oven spring upon baking. In the preparation of the Danish in an exemplary embodiment provided herein, the high gluten content decreased the extensibility of the dough.

A re-work dough composition can be prepared as a normal dough composition, using a full allocation of ingredients of a final dough composition (as compared to the portion of ingredients used in preparing a sponge), and by combining the ingredients in a manner typical of producing the final dough composition. Ingredients will include standard dough ingredients such as flour, yeast, and water, optional ingredients such as gluten and a yeast nutrient, and typically also ingredients such as shortening (oil or plastic), sugar, flavorings, additives, etc. These ingredients are combined in an acceptable manner, e.g., by mixing, and processed for a time that causes the yeast to metabolize and the dough composition to develop, whereupon the recycle portion becomes removed from processing and available as "re-work." The amounts of each ingredient in each of the dough composition and the re-work are the same amount, which are the amounts used in producing the original and ultimately-desired dough composition, because the re-work composition has the same formulation as the dough composition. Thus, when discussing amounts of ingredients of a re-work portion, they are typically the same as a desired final dough composition.

The re-work dough portion can include ingredients as described in the sponge, above, for strengthening the dough composition matrix. This may include a grain constituent that contributes to the structure of the re-work and ultimately to the structures of the dough composition and baked dough composition. Suitable flours include hard winter wheat and spring flours with protein ranges of from about 10 weight percent to about 16 weight percent protein, based on the weight of the flour. A high protein flour (containing between about 12 and about 16 weight percent protein) can be preferred, because proteins facilitate conditioning and strengthening of the sponge. Although less preferred, soft wheat flour or lower protein flours can also be used.

The re-work typically includes an amount of flour effective to provide desired structure and consistency, i.e., structure and consistency that allow for fermentation of yeast, expansion, and formation and retention of bubbles. Exemplary amounts of flour in a re-work composition can be the same as a final dough composition, e.g., in the range between about 35 weight percent and about 60 weight percent flour based on the weight of the dough, preferably between about 40 weight percent and about 55 weight percent, and more preferably between about 45 weight percent and about 55 weight percent. These amounts are based on flour having about 13 weight percent to about 15 weight percent moisture, about 12 weight percent to about 14 weight percent wheat protein, and about 0.4 weight percent to about 0.6 weight percent ash based on the amount of flour.

Yeast can be included in the re-work in any amount that will produce a desired amount of metabolites, which will in turn cause the re-work to develop and strengthen. Amounts of yeast normally used in typical dough compositions can be useful. While amounts outside of these exemplary ranges may also be useful, such amounts can be in the range from about 4 to about 8 weight percent yeast based on the total weight of the dough composition, preferably from about 5 to about 7 weight percent yeast based on the total weight of the dough composition.

The type of yeast can be any of a variety of yeasts that are well known, with certain types, such as cake yeast, or compressed yeast with roughly 30% solids being preferred.

A yeast nutrient can preferably be included in a standard dough composition, and therefore a re-work portion. Yeast nutrient as used herein includes nutrients such as sugar as well as "yeast foods." The amount of yeast nutrient included can be any amount that is appropriate for the amount of yeast, to produce a desired amount of metabolites, as will be understood by a skilled artisan.

A dough composition and re-work can optionally and preferably include a strengthener such as a protein-based strengthener, e.g., gluten, transglutaminase, or other known strengtheners, for increasing strength and extensibility. The use of a strengthener can increase gas-holding capacity by allowing expansion instead of breaking upon evolution of carbon dioxide by yeast; i.e., the strengthener can provide desirable viscoelastic properties. Various types of strengtheners may be used, as will be understood by a skilled artisan, with a preferred strengthener being gluten, especially vital wheat gluten, and another preferred strengthener for certain embodiments of the invention can be transglutaminase.

Generally, a useful amount of gluten can be any amount that will strengthen the re-work, with preferred amounts being in the range from at least about 2 weight percent of the dough, preferably at least 6 weight percent of the dough.

Generally, a useful amount of transglutaminase as a strengthener can be any amount that will strengthen the re-work.

A dough composition and re-work portion include liquid water in an amount that, with the other ingredients, will produce a re-work and dough composition having useful properties, including useful structure and consistency, i.e., structure and consistency that allow for fermentation of yeast, expansion, and formation and retention of bubbles. Preferred amounts of water can be at least about 25 weight percent, e.g., an amount in the range from about 25 to about 40 weight percent, preferably from about 30 to 35 weight percent, based on the weight of the re-work.

Because the re-work can have the same composition as the final dough composition, the re-work can normally include other ingredients, including amounts of flavoring, sugar, shortening (oil or plastic), or additives or preservatives, as discussed elsewhere in this disclosure.

The ingredients of the re-work can be combined in any useful manner, as used to begin processing of a dough composition, normally by standard mixing and subsequent processing so the dough composition/re-work portion contains bubbles and a developed dough composition matrix. This can include steps of mixing, resting, cooling, lapping, cutting sheeting, etc. At some point in the processing of the dough composition, a portion of the in-process dough composition is removed from processing as the re-work portion. According to the invention, this re-work portion, containing a developed dough matrix, metabolized yeast, and bubbles, is combined with dough ingredients, as described herein, somewhere upstream in the processing of the dough composition.

The use of the re-work portion as a metabolized portion, according to the invention, works according to the same principles as apply to the use of a sponge as a metabolized portion. The re-work composition can include a relatively high concentration of carbon dioxide, including gaseous carbon dioxide and carbon dioxide dissolved in the water. The re-work composition also has a highly developed matrix that will exhibit high viscoelasticity and therefore also exhibit a strong capacity to retain gaseous carbon dioxide in the form of bubbles. Additional ingredients are added to the re-work portion, i.e., the re-work is combined with the in-process dough composition, and the combined dough composition is processed to produce a dough composition. According to the invention, the bubbles and carbon dioxide present in the re-work portion can be maintained through the production of a final dough composition. This means that a substantial amount, preferably a majority of, the bubbles and carbon dioxide in the re-work are also present in the final dough composition produced from the re-work. The carbon dioxide and bubbles later contribute to expansion of the dough composition during baking and increase the baked specific volume of the baked dough product. Overall, the production of carbon dioxide in the described form and amounts in the re-work, in combination with the presence of non-metabolically active yeast in the dough composition, can eliminate the need for a proofing step prior to freezing or baking, because carbon dioxide and the bubbles formed by the carbon dioxide, remains present through subsequent processing to the dough composition, and the carbon dioxide (in combination with non-metabolically active yeast) will be present during baking in amounts sufficient to expand the dough composition without prior proofing, and without the need for thawing, preferably without the need for chemical leaveners.

Additional Dough Ingredients

Additional dough ingredients are combined with the metabolized dough portion, to produce a dough composition.

Examples of such additional dough ingredients can include, generally, any one or more of the following: additional flour; water; strengthener such as gluten, chemical oxidants, surfactants or transglutaminase, possibly in addition to an amount of strengthener already included in a sponge or re-work composition; leavening agents such as yeast; shortening; and other ingredients and additives such as flavorings, sweeteners (e.g., sugar), water-binding agent, and others.

The relative amounts of metabolized portion to additional dough ingredients can be any amounts of each that will result in a useful dough composition, as described herein, preferably in relative amounts that will allow freezer-to-oven processing of the dough composition combined with useful or desirable final bread properties. Preferably, the amount of metabolized portion as a portion of a total dough composition can be an amount that has a measurable effect on the baked specific volume of a baked dough composition prepared from the dough, e.g., an amount that causes an increase in the baked specific volume of a baked dough product prepared from the dough, as compared to a baked product prepared from a dough composition made with identical amounts of ingredients but not prepared using a metabolized portion and processing as described herein. Also preferably, this can be accomplished without chemical leavening agents, par baking, proofing, or modified atmosphere packaging.

For instance, metabolized portion in a total dough composition (metabolized portion plus additional ingredients) in an amount in the range from about 10 to about 90 parts metabolized portion based on 100 parts total dough composition can be useful.

For a metabolized portion in the form of a pre-fermented sponge, it may be useful to include nearly any relative amount of the pre-fermented sponge. For example, without identifying any limit with respect to the invention, useful relative amounts of a pre-fermented sponge per total dough composition may be from about 25 to about 80 parts by weight pre-fermented sponge per 100 parts total dough composition, e.g., from about 45 to about 60 parts by weight sponge.

For a re-work dough composition as the metabolized portion, it may be useful to include nearly any relative amount. Without identifying any limit with respect to the invention, useful relative amounts of a re-work dough composition per total dough composition may be from about 5 to 50 percent.

Flour

Suitable flour for the dough composition can be flour as described above with respect to the sponge or re-work, or any other flour. The added flour may be the same or different from the flour included in the metabolized portion. Many flours are generally known, useful, or commercially available, with high protein flours being preferred.

The amount of flour added to the metabolized portion to produce the dough composition can be enough such that the total flour in the dough composition can be effective to provide desired structure and consistency to the dough composition. The total amount of flour in the dough composition should not be so high to cause the dough composition to be dry or weak, i.e., have little extensibility and therefore reduced ability to expand. A dough composition can, for example, include flour in an amount of between about 30 weight percent and about 55 weight percent, preferably between about 35 weight percent and about 50 weight percent, and more preferably between about 40 weight percent and about 45 weight percent.

These amount of total flour in a dough composition are based on flour having about 13 weight percent to about 15 weight percent moisture, about 12 weight percent to about 14 weight percent wheat protein, and about 0.4 weight percent to about 0.6 weight percent ash based on the amount of flour. One skilled in the art having read this description will readily understand that flour amounts suitable for use with a dough composition can vary on a variety of factors including, for example, the characteristics of flour used and the desired properties of the dough composition and the baked dough product.

Water

The amount of water added to the metabolized portion can be enough to provide the final dough composition with an amount of water that is effective to provide a desirable dough composition consistency.

Water can act as a plasticizer, a leavening agent, or both. When water acts as a plasticizer, water provides the dough composition with extensibility. Desirable extensibility facilitates baking the dough composition into a product having a desirable baked specific volume. Moreover, water can facilitate the leavening of the dough composition by forming steam, which acts to expand the dough.

The amount of water from all sources, for example, water, eggs, milk, etc., should not be so high that the dough composition becomes so soft that it cannot maintain a desired structure, especially a closed-cell structure comprising a developed matrix containing bubbles of carbon dioxide and water vapor. On the other hand, the amount of water should not be so low that the dough composition is dry has no ability to expand, i.e., extensibility.

Strengthener

A strengthener, e.g., a protein supplement such as gluten, transglutaminase, or another strengthener, can be included in a dough composition to provide desired structure and strength. A strengthener can contribute to a baked product prepared from a dough composition, a crisp, brown outer crust as well as a tender interior that is moist but not doughy. Strengtheners such as protein supplements that provide these characteristics are generally known.

In general, strengtheners can react protein ingredients in a dough composition to provide improved viscoelasticity. This strengthens and develops a dough composition, allowing expansion of the dough composition during processing and allowing the dough composition to maintain bubbles. Additionally, a strengthener can strengthen or develop a dough composition, e.g., dough composition matrix, to provide stability and mechanical durability of the matrix during freezing and allowing bubbles to be maintained through frozen storage, even through multiple freeze-thaw cycles.

Exemplary suitable protein supplements can include proteins resulting from amino acids such as, for example glycine, alanine, leucine, isoleucine, valine, phentolamine, turicine, tryptophan, proline, methionine, cystine, serine, threonine, asparagine, glutamine, histidine, aspartic acid, glutamic acid, lysine, and arginine. Other suitable protein supplements include, for example, α-keratin, collagen, fibroin, sclerolin, myosin, actin, carboxypeptidase, trypsin, ovalbumin, casein, and the like.

The dough composition may include a dairy protein, an egg protein, a wheat protein, or a combination thereof. Examples of suitable dairy proteins include whey, soy protein, caseinate, buttermilk, buttermilk solids, and nonfat dry milk.

Examples of suitable egg proteins include albumin. Examples of suitable wheat proteins include gluten or those derived from flour. The dough composition includes a protein supplement in an amount from all sources, for example, eggs, flour, gluten, etc., effective to provide a baked product having a crisp exterior and a moist but nondoughy interior. The total amount of protein supplement in the dough composition should not exceed an amount that would provide a tough, crumbly baked product. Yet the total amount of protein supplement should not be so low that a dough composition provides a baked product having a gummy, doughy texture.

A dough composition can typically include a protein supplement such as gluten in an amount that will provide desired properties as described herein. Exemplary amounts can be in the range between about 2 weight percent and about 8 weight percent, preferably between about 3 weight percent and about 7 weight percent, and more preferably between about 4 weight percent and about 6 weight percent based on the total weight of the dough.

Other materials that can be used as strengtheners include transglutaminase, ascorbic acid, diacetyl tartaric acid esters of mono and diglycerides ("datem"), and sodium stearoly lactylate ("SSL").

Transglutaminase is an enzyme that may be useful in embodiments of the invention to strengthen dough by connecting proteins. Transglutaminase is readily available.

Shortening

Shortening must generally be included in the dough composition. Shortening contributes to a baked dough product having desirable palatability, physical texture, physical form, and overall aesthetic appeal. The shortening generally provides a baked product with a tender, soft, fluffy mouth feel; a light flaky texture; and a crisp outer crust with a glossy appearance. Shortening can also act as a plasticizer and can contribute to the volume and grain of a baked product. Shortening can be natural, for example, animal or vegetable shortening, or synthetic.

Shortenings generally include fats and fatty oils, which are made of predominantly triesters of glycerol with fatty acids, commonly called triglycerides. The number of triglycerides in a given natural fat is a function of the number of fatty acids present and specificity of the enzyme systems involved in that particular fat-synthesis reaction.

Fats and fatty oils useful in producing shortening consistent with the invention include cottonseed oil, ground nut oil, soybean oil, sunflower oil, rape seed oil, sesame oil, olive oil, corn oil, safflower oil, palm oil, palm kernel oil, coconut oil, and combinations thereof.

The dough composition can include any number of shortening compositions having a variety of physical states and/or physical forms. Suitable physical states of shortening include liquid, semisolid, and solid. Suitable physical forms of shortening include plasticized shortening, chip shortening, and extruded shortening. Preferably the shortening in the dough composition includes butter, hydrogenated vegetable oil, hydrogenated soybean oil, or a combination thereof.

The amount of shortening in a dough composition is effective to provide a baked product having a tender, soft, fluffy mouth feel; a light, flaky texture; and a crisp outer crust. The amount of shortening should not exceed an amount that would provide a baked product having a gummy texture. Yet the amount of shortening should not be so low that a dough composition of the invention provides a baked product having a tough, dry, crumbly texture and a less than desirable specific volume.

Water-Binding Agent

A dough composition of the invention may include a water-binding agent (also referred to as a "freezing temperature reducing agent").

A freezing-temperature reducing agent or water-binding agent can be added to either a sponge or a dough composition to reduce the amount of water of a dough composition that freezes, keeping more water in the dough composition in a liquid form. Because liquid water absorbs relatively more carbon dioxide than ice, preventing the water from freezing allows more carbon dioxide to be absorbed by the dough composition. Thus, the effect of a freezing-point depressant can be to increase the amount of un-frozen water in the frozen dough composition, thereby increasing the amount of absorbed carbon dioxide.

Any type and amount of freezing-point depressant can be useful, as will be understood by a skilled artisan, and many are commercially available. A preferred example of a freezing point depressant is alcohols generally, including ethanol. The amount can be any amount that will reduce the freezing point of the dough composition, and the exact amount used in any dough composition will depend on a variety of factors including the balance of the ingredients in the dough composition, and the particular freezing-point depressant being used.

Other water-binding agents suitable for use in a dough composition of the invention include gelling agents and thickening agents. A suitable gelling agent includes any compound that can form a gel. Examples of gelling agents include hydrocolloid gums and gel-forming proteins. Examples of suitable hydrocolloid gums include pectin, alginate, carrageenan, carboxymethyl cellulose, methyl cellulose, hydroxypropyl cellulose, hydroxypropylmethyl cellulose, etc.

Examples of suitable gel-forming proteins include gelatin, hydrolyzed gelatin, gelatin precursors such as collagen, etc.

Some gelling agents that have been particularly useful in a dough composition of the invention are those packaged with an amylase such as, for example, GEN® FREEZE (Copenhagen Pectin A/S, Denmark) and GENU® FOOD GUM X6021 (Copenhagen Pectin AIS, Denmark). Thus, a dough composition of the invention can include an amylase. An amylase includes any enzyme that can hydrolyze O-glucosyl linkages in starch, glycogen, and related polysaccharides. Examples of amylase include α-amylase.

The amount of water-binding agent in a dough composition is effective to provide desirable baking development and desirable frozen stability. The amount of water-binding agent should not exceed an amount that would result in a dough composition that is so dry that it loses its ability to expand. Yet the amount of water-binding agent should not be so low that the amount of water absorbed into the dough composition is so negligible that a desirable baked product cannot be prepared, or, in the case of a laminated product, becomes so soft that its dough layers merge with shortening layers.

The amount of such water-binding agent can be in a range of between about 0.2 weight percent and about 1 weight percent, preferably between about 0.5 weight percent and about 0.9 weight percent, and more preferably between about 0.6 weight percent and about 0.8 weight percent based on the total weight of dough composition. Moreover, a dough composition of the invention typically includes a ratio of water-binding agent to water of between about 0.005:1 and about 0.05:1, preferably between about 0.015:1 and about 0.025:1, and more preferably between about 0.01:1 and about 0.03:1.

Non-Metabolically Active Yeast

A dough composition of the invention includes non-metabolically active yeast to, during baking, metabolize and increase the volume, and alter the texture of a baked product prepared from dough composition.

The amount of a non-metabolically active yeast, when considered with other leavening agents in the dough composition such as carbon dioxide, bubbles, air, steam, etc., cause leavening of a dough composition during baking. A non-metabolically active yeast can be present in the dough composition in an amount of between about 0.5 weight percent and about 6 weight percent, preferably between about 0.75 weight percent and about 5 weight percent, and more preferably between about 3 weight percent and about 4 weight percent based on the total weight of the dough. In one embodiment, approximately ⅓ metabolically active yeast and ⅔ non-metabolically active yeasts are used (i.e. 2% active and 4% non-active).

Other Additional Ingredients

Dough compositions also typically include sugar and salt. Salt can enhance the flavor of a baked product prepared from a dough composition of the invention, impart toughness to the gluten, and provide strength to the crumb. Salt can be present in an amount effective to provide a desirable flavor.

Salt is typically present in a range of between about 0.3 weight percent and about 1 weight percent.

Sugar can also enhance the flavor of a baked product prepared from a dough composition of the invention. Sugar acts as a substrate for yeast and as a starting material for the Maillard reaction, which facilitates color formation of the crust. Sugar is typically present in a range of between about 1 weight percent and about 6 weight percent of the total dough composition. Suitable sugars include granulated sugar, honey, high fructose corn syrup, etc.

The dough composition of the invention can also include other additives, for example, emulsifiers, dough-developing agents, nutritional supplements, flavorings, shelf-life stabilizers, thickeners, organic acids, oxidizers, and the like. Additives can modify texture or any number of characteristics of a dough composition of the invention or a baked product resulting therefrom.

An emulsifier can influence the texture and homogeneity of the dough composition mixture, increase dough composition stability, and improve the eating quality of a baked product. An emulsifier includes nonionic surfactants, anionic surfactants, and cationic surfactants. Suitable emulsifiers include, for example, lecithin, mono- and diglycerides of fatty acids, propylene glycol monoesters and diesters of fatty acids, glyceryl-lacto esters of fatty acids, ethoxylated monoglycerides and diglycerides, sodium stearoyl lactylate, etc.

In one embodiment, a dough composition of the invention includes an emulsifier including sodium stearoyl lactylate (SSL), diacetyl tartaric acid ester of monoglycerides and diglycerides (DATEM), or a combination thereof.

A dough-developing agent can enhance the viscosity, texture, and plasticity of a dough composition of the invention. Any number of dough-developing agents can be used including, for example, azodicarbonamide, ascorbic acid, sodium bisulfite, potassium bromate, benzoyl peroxide, and organic acids such as potassium sorbate or salts of organic acids.

In one embodiment, a dough composition of the invention includes a dough-developing agent including azodicarbonamide, ascorbic acid, or a combination thereof.

A nutritional supplement such as, for example, vitamins, minerals, proteins, and the like can be added to a dough composition of the invention. Examples of nutritional supplements include thiamin, riboflavin, niacin, iron, calcium, etc.

Flavorings such as, for example, sweeteners, spices, and specific flavorings can be added to a dough composition of the invention. Sweeteners include, for example, regular and high fructose corn syrup, sucrose (cane or beet sugar), dextrose, and the like.

Shelf-life stabilizers such as, for example, preservatives and mold inhibitors can be added to a dough composition of the invention. Suitable shelf-life stabilizers include, for example, sodium salts of propionic or sorbic acids, sodium diacetate, monocalcium phosphate lactic acid, stearoyl lactylate, ascorbic acid, etc.

Oxidizers such as, for example, ascorbic acid, azodicarbonamide, etc., can also be added to a dough composition of the invention to strengthen the dough.

A thickening agent suitable for use with a dough composition of the invention includes any compound that can increase the viscosity of a medium when the compound is dispersed in water. An example of a suitable thickener includes guar gum.

Table 1 illustrates the useful, preferred, and more preferred ranges of the flour, strengthener, shortening, water-binding agent, and leavening agent included in a dough compositions of the invention.

Exemplary Dough ingredients

| INGREDIENT | WEIGHT PERCENT | | |
| --- | --- | --- | --- |
| | USEFUL | PREFERRED | MORE PREFERRED |
| Flour | 30-55 | 35-50 | 40-45 |
| Strengthener (e.g., gluten) | 2-8 | 3-7 | 4-6 |
| Shortening | 3-10 | 5-9 | 6-8 |
| Water | 25-35 | 26-41 | 27-30 |
| Water - binding agent | 0.2-1 | 0.5-0.9 | 0.6-0.8 |
| Yeast (total) | 0.5-6 | 0.75-5 | 3-4 |
| Non-metabolically active yeast | 1-6 | 2-5 | 3-4 |
| Metabolically active yeast | 0-3 | 0.5-2.5 | 1-2 |

A dough composition of the invention can optionally be free of relaxing agents that facilitate a dough's resistance to mechanical stresses such as mixing, sheeting, etc. Relaxing agents can adversely affect the shelf life of frozen doughs as well as specific volume. The term "free of" as used herein includes an amount of less than 20 ppm, preferably no more than 15 ppm, and more preferably no more than 10 ppm based on flour. Relaxing agents can include reducing agents such as, for example, cysteine, bisulfate, sorbate, etc. In one embodiment, a dough composition of the invention is free of cysteine. A dough composition of the invention can also be free of a modified starch (e.g., cross-linked starches derived from maize or tapioca).

Dough compositions of the invention can be un-proofed, non-par baked, freezer-to-oven, yeast-leavened dough compositions. These dough compositions can be baked to baked specific volumes that are typical and conventional in the baking industry of useful yeast leavened dough products, including pre-proofed or thawed-and-proofed yeast-leavened dough products. For example, the dough compositions of the invention can be baked from frozen to produce a baked dough product having a baked specific volume of at least 2 cubic centimeters per gram (cc/g).

Considered differently, the dough compositions of the invention, as described herein to be prepared from a metabolized portion (e.g., sponge or re-work), and other described ingredients and processing steps, can be baked to a baked dough product that is substantially of the same quality and preferably of an improved quality, as compared to conventional baked dough products that use standard methods and no metabolized portion as discussed herein. For example, a baked dough product of the invention may exhibit a baked specific volume that is from about 50 to about 100 percent greater in baked specific volume compared to a baked product prepared from a dough composition of the same ingredients but with no pre-fermenting of a sponge, or including no re-work, or even including the use of a sponge or re-work but in different amounts or using different (standard) processing techniques.

The actual baked specific volume of any particular dough product of the invention can depend on the type of dough product, the use of selected processing steps as described herein, relative amounts of ingredients, and the exact dough formulation. Exemplary baked specific volumes of dough product prepared according to the invention, e.g., using a metabolized portion such as a pre-fermented sponge or re-work dough composition, can preferably be at least about 2.5 cc/g, preferably at least about 3 cc/g, even up to about 5.5 or 6 cc/g. The baked specific volume of a baked dough product will depend greatly on the composition of the dough composition and the type of dough product it is composed to produce, e.g., a bread loaf, a roll, a sweet roll, a pizza crust, Danish, etc. The methods and compositions of the invention can result in improved baked specific volumes for all of these and other types of dough products.

Processing a Metabolized Portion into a Dough Composition

A metabolized portion can be combined with additional dough ingredients by any useful methods, as will be understood, based on this description, by one of skill in the arts of dough compositions and processing. The metabolized portion can generally be combined with additional dough ingredients in any manner that allows the production of a dough composition. Conventional and known methods of preparing dough products will be useful, such as by mixing.

According to the invention, the metabolized portion can be combined with additional dough ingredients in a manner and under conditions that allow the gluten-stabilized bubbles of the metabolized portion to be effectively maintained in the final dough composition. The bubbles that are transferred from the metabolized portion to the final dough composition are preferably retained in the dough composition to later serve as nucleation sites for gases (e.g., carbon dioxide, water vapor) to cause expansion of the dough, without the need for proofing, in a subsequent baking step.

The metabolized portion can be combined with the additional dough ingredients as necessary or useful, and as appropriate, depending on the type and composition of the metabolized portion. If the metabolized portion is a sponge as discussed according to one embodiment of the invention, the sponge can be first prepared and then the additional ingredients (separately or together) can be incorporated into the sponge to make a final dough composition having the composition of the combined sponge and additional ingredients. If the metabolized portion is a re-work dough composition, as discussed as another embodiment, the re-work portion is removed from a dough composition that is essentially a complete dough composition. After the re-work is removed from that dough composition, the re-work is combined with "additional dough ingredients," i.e., the dough composition from which the re-work was removed, but upstream from where removal occurred, to prepare a final dough composition having the same composition as the original dough composition from which the re-work was removed, and also the same composition as the re-work. According to the invention, the combined finally-processed dough composition will retain bubbles and metabolically active yeast from the metabolized portion, and non-metabolically active yeast from the added dough ingredients or dough composition.

In preferred embodiments, a dough composition can be prepared by combining a metabolized portion (e.g., a prefermented sponge or re-work) with additional dough ingredients, and mixing until the dough composition is fully developed. "Fully developed" refers to transforming the mixture into a cohesive mass such that the dough composition is substantially homogenous and soft.

As described, the metabolized portion of dough contains actively fermenting or metabolically active yeast and therefore metabolites such as carbon dioxide and ethanol. It is possible, and in some embodiments of the invention preferable, for the actively-fermenting yeast of the metabolized portion to continue evolving metabolites, e.g., carbon dioxide, into later processing steps of combining the metabolized portion with other dough ingredients, and through a portion of cooling, processing, folding, lapping, cutting, and freezing, thereby adding additional carbon dioxide and larger bubbles to the dough composition. In general, the larger the initial RSV, the larger the final baked specific volume ("BSV") upon baking. Generally, a dough product having a BSV of between about 1.2 and 1.5 is preferred.

The BSV of a product relates the volume of the baked product to the weight of the product. Generally, products with higher BSVs are lighter and have more gas or air incorporated into the product. Products with lower BSVs are heavy, dense and generally are undesirable in developed doughs.

BSV can be measured using commonplace displacement methods. One example of a method commonly used is the rapeseed method. In this method, a baked product of a known mass is placed in a container containing a known and measurable volume of rapeseed. Once the baked product is placed in the container containing the baked product, the volume of the rapeseed and baked product is measured. The specific volume of the baked product is then determined by dividing the volume of the baked product by the mass of the baked product.

Generally, BSV is reported in ml/g developed dough products such as baked breads and rolls generally have BSVs of from about 4 ml/g to 7 ml/g. Dough products, such as baked breads and rolls generally have improved BSVs. Improved BSVs can refer to higher values of BSV or similar values of BSV obtained with a shorter mixing time for the dough. In one embodiment, methods of the invention provide baked goods with BSVs similar to doughs that were mixed for a longer period of time.

Equipment useful for mixing the metabolized portion and additional dough ingredients will be readily understood, and is commercially available. An example of a suitable mixer includes a vertical mixer (Hobart, Troy, Ohio). During mixing, the dough composition of the can desirably be maintained at a temperature that maintains the structure of the dough composition to facilitate handling. Typically the temperature should be in a range of between about 60° F. and about 70° F., preferably between about 62° F. and about 68° F., and more preferably between about 64° F. and about 66° F. Preferably the mixer can be equipped with a refrigeration system such as, for example, a jacketed glycol coolant to maintain the dough composition of the invention within the desirable temperature range.

To maintain the desirable temperature, the water added can be at a temperature suitable for maintaining the dough composition at the desirable temperature. Preferably the water is at a temperature of between about 60° F. and about 65° F. To bring the water to a temperature suitable for maintaining the dough composition at the desirable temperature, a portion of the water can be replaced by shaved or crushed ice. The amount and size of the shaved or crushed ice can be determined so that the ice can melt in the water, the dough, or both during mixing without leaving ice in the mixed dough. If ice remains in the mixed dough, wet spots will appear in the dough, which is undesirable. The size of the shaved or crushed ice can typically be up to about 1 cm. The portion of water that is replaced by shaved ice can be up to about 50 weight percent of total water.

The dough composition can be mixed at a speed and time suitable for fully developing the dough. For example, the ingredients can initially be mixed on low speed for about 30 seconds and then mixed on medium speed for between about 8 minutes and about 12 minutes. These times and speeds are merely illustrative and can vary depending on the amount of dough composition being mixed and on the type of mixer.

After mixing, a dough composition desirably has a temperature of between about 60° F. and about 70° F., preferably between about 62° F. and about 68° F., and more preferably between about 64° F. and about 66° F.

Processing

Once the dough composition has been prepared, it can be further processed according to known methods of forming a dough composition into a desired size and shape (followed by other processing steps such as packaging, freezing, and cooking). A variety of techniques can be used for processing. For example, processing of the dough composition can include one or more of sheeting, extruding, dividing and rounding, and the like; cutting to a desired size and shape; folding; filling; and cooking. According to the invention, any processing can be useful, including any one or more of those identified directly above. Preferred processing techniques can include sheeting, dividing and rounding, or any other technique that results in a processed dough composition that contains bubbles, metabolically active yeast, and non-metabolically active yeast, to provide freezer-to-oven capabilities as described herein.

As mentioned herein, processing of a dough composition according to the invention can also include removal of dough composition, in-process, as re-work, for re-introduction into the processing at an upstream step. This is specifically useful in the "re-work" embodiment, but can also be useful in the "sponge" embodiment, or other embodiments that will make use of the overall inventive concepts described herein.

The sheeted or divided and rounded dough composition can be assembled into any of a variety of shapes and products, as desired. Methods and equipment for shaping, sizing, or otherwise cutting sheeted dough compositions are well known.

The size and shape of the dough product may depend on the type of dough product being prepared, as well as other factors such as the dough composition, e.g., whether it is light and/or sweet like a donut or heavy like a pretzel or bagel, whether or not it is intended to be heated (e.g., in a toaster), etc.

In one embodiment of the invention, the dough product can be cut and rolled into the form of a Danish, which can be formed by cutting a strip of dough composition, adding flavoring to a surface, and rolling from an end. Another embodiment provides for shaping the dough composition into a pizza crust.

Methods of shaping and sizing a dough product, including steps of sheeting, cutting, folding, perforating, crimping, and otherwise assembling, are well known, and are described, for example, in Assignee's copending U.S. patent application Ser. No. 09/432,446, filed Nov. 3, 1999, incorporated herein by reference.

Certain embodiments of inventive dough compositions, e.g., Danishes or croissants, can be processed and assembled into a laminated dough product, using methods more generally known in the dough products art, by processing the dough composition using a laminating or lapping step. Such laminated dough products generally include shortening layers alternating with dough layers, produced by lapping. Exemplary laminated products and lamination processing steps are described, for example, in Assignee's U.S. Pat. No. 6,579,554 entitled "Freezer-to-Oven Laminated, Unproofed Dough and Products Resulting Therefrom," filed Apr. 14, 2000, the entire disclosure being incorporated herein by reference.

Generally, processing to a laminated product can be accomplished by taking a dough composition and rolling in shortening layers. Rolling in shortening can be performed by known methods, and generally involves incorporating and maintaining layers of shortening between adjacent layers of dough composition. The dough composition and shortening are separately prepared. Shortening can be rolled into the dough composition by first wrapping a slab of shortening with the dough composition and then sheeting to prepare a sheet of layered dough and shortening. The sheet can be repeatedly folded and sheeted to provide a laminated dough having multiple adjacent layers of shortening and dough composition.

Shortening in the shortening layers can include any solid shortening, which can be natural or synthetic as described above. Preferably the shortening in the shortening layers includes butter.

According to the invention, when processing by lapping to produce a laminated dough product, the lapping step can also provide an amount of entrapped gas for leavening during baking. Thus, the metabolized portion of the dough composition need not contain as high of a concentration of bubbles or gas as when producing non-laminated dough products. Therefore, in preparing a laminated dough product, it can be preferred to use a metabolized portion of dough (e.g., re-mix or sponge) having a relatively low amount of gas or bubbles, so that the bubbles do not interfere with lapping and disrupt the laminated layers.

Many different embodiments of the invention will be understood by those of skill in the dough products and dough processing arts. As one specific example, this specification describes the preparation of a pre-fermented sponge and combination of that sponge with additional ingredients including non-metabolized yeast, to produce a frozen dough composition that can be baked from frozen, without proofing or par-baking, and without the need for modified atmosphere packaging. As another example, the present specification describes a similar process that uses re-work dough in place of the pre-fermented sponge. The re-work contains carbon dioxide bubbles and developed dough matrix, as does the sponge, and therefore provides a useful metabolized dough portion.

Other additional processing steps and techniques, as will be understood by those of skill based on the overall disclosure herein, are contemplated to be used in combination with the specifically-described concepts identified. As an example, it will be apparent that the methods described herein for preparing dough compositions will be useful in combination with continuous dough processing techniques. The sponge or re-work embodiments each allow for continuous processing of a dough composition, including continuous preparation and further processing of fermented sponge, or continuous re-working of any dough composition prepared by a sponge method or otherwise. In particular, the invention contemplates the use of a sponge dough method to initialize a continuous dough production method, and thereafter, once steady-state processing is achieved, eliminating the use of pre-fermented sponge and replacing the metabolized portion in the form of a pre-fermented sponge with a metabolized portion in the form of re-work dough removed from a downstream section of the processing line (e.g., a cutting section) and re-introduced into the process upstream, e.g., at the mixing stage. The mixing stage can be preferred for re-introduction of re-work, because re-introduction of re-mix at the mixing stage allows bubbles from the re-mix to be incorporated into and maintained in the resultant combined mixed dough composition.

Shaping/Forming the Dough Composition

The processed dough composition can be formed into any desirable shape, such as the shapes typically used for a desired dough product, e.g., a croissant, Danish, loaf, pizza crust, roll, etc. The formed dough composition can be transferred to any container suitable for freezing. The dough composition can be shaped as desired, or otherwise processed using known methods and equipment. For example, the dough composition may be processed by any combination of layering, extruding, rolling, folding, cutting, combining with other dough materials or fillings, layered with additional shortening, frosted, or processed in any other fashion to form any of a countless variety of dough products for baking. One skilled in the art having read the specification would understand that the mixing and rolling steps are generally performed using good puffed-pastry technique.

A dough composition of the invention is particularly desirable because it can prepare a baked dough product that has a specific volume of at least 3 cc/g, preferably between about 4 cc/g and about 6 cc/g, and more preferably between about 4.5 cc/g and about 5.5 cc/g, without pre-proofing, and without the need for chemical leavening agents.

One advantage of a dough composition of the invention is that it does not need to be proofed or thawed prior to baking, which is useful for saving time and storage space.

Another advantage of a dough composition of the invention is that the dough composition is more resilient to temperature fluctuations so that it can maintain its stability and integrity, through freezing and thawing. This is a result, at least in part, of the developed dough matrix.

Another advantage of a dough composition of the invention is that the dough composition does not need to be packaged under a modified atmosphere.

In one embodiment of the invention, a coating or glaze may be placed on the dough, e.g., after forming, to minimize the loss of gaseous carbon dioxide from frozen dough composition over shelf life time. Such a coating is optional, and is not required according to the invention to maintain an amount of carbon dioxide in the dough composition. The coating should be suitable for a food product, and may be any material that acts as a barrier to gaseous carbon dioxide. An example of a suitable coating can be a thin vainer of ice. Another example of a suitable barrier is a guar wash, which can be an aqueous solution containing guar.

Freezing and Packaging

After a dough composition is formed into a desired shape and placed into a container, the dough composition can be frozen to a temperature suitable for shipping and storage. A dough composition can preferably be frozen as quickly and completely as possible. A dough composition prepared as described herein can be frozen and stored frozen for up to about two months, preferably up to about four months, and more preferably up to about six months. Temperatures suitable for freezing a dough composition of the invention include, for example, less than about 30° F., preferably less than about 10° F., and more preferably less than about −10° F.

The dough composition can be packaged by any desired methods and using any desired packaging materials. The packaging need not be air tight, but can preferably be closed to prevent water loss. The dough composition can be shelf stable without storage in a package that contains a modified atmosphere such as, for example, without storage in concentrated carbon dioxide, nitrogen, or with limited head space. Such modified atmosphere packaging can be used if desired. "Shelf stable" refers to the dough composition of the invention being suitable for storage at freezing temperatures without the dough composition substantially breaking down by, for example, by microbial contamination, water accumulation, failure of the leavening agent, etc. and becoming unsuitable for consumption.

Baking Step

For baking, the oven can be cold or preheated. The baking temperature and time can depend on, for example, the size and shape of the dough composition as well as whether the oven is cold or preheated. The temperature of the oven can be in a range of, for example, between about 365° F. and about 400° F., preferably between about 370° F. and about 380° F., and more preferably between about 375° F. and 377° F. The dough composition can be baked at this temperature for between about 22 minutes and about 32 minutes, preferably between about 24 minutes and about 30 minutes, and more preferably between about 25 minutes and about 27 minutes.

While not wishing to be bound by theory, it is believed that the yeast of the dough composition have limited time or opportunity to evolve carbon dioxide during the baking cycle. As described earlier, the metabolically active yeast in the sponge contribute carbon dioxide to the dough composition prior to freezing, during the preferment process. Upon freezing, the solubility of the carbon dioxide increases significantly, effectively increasing the concentration of carbon dioxide in the unfrozen water portion of the dough. Upon baking, the solubility of the carbon dioxide decreases and gaseous carbon dioxide is released into the dough, and expands to result in an increase in the specific volume of the baked dough product. Also contributing to leavening during baking will be the amount of non-metabolically active yeast in the dough composition.

One skilled in the art would understand that the baking time and temperature may vary depending on the extent the dough composition is thawed.

EXAMPLES

Materials & Methods: Dinner Roll

Dough composition prepared as follows:

| | Formula 1 = 4& Batees | |
|---|---|---|
| (2% lpf) | % Protein (FB)): | 26.505 |
| | FLOUR/WATER: | |
| | BATCH WT (GMS): | 2500 |

| INGREDIENT | CHEMIST [%] | WT (GMS) |
|---|---|---|
| Hard Flour, BL | 47.04 | 1176 |
| WATER | 30.06 | 751.5 |
| Gluten | 6.00 | 150 |
| Dough composition Conditioner | 0.40 | 10 |
| Salt | 1.00 | 25 |
| Butter | 4.00 | 100 |
| Glycerol | 1.50 | 37.5 |

-continued

| INGREDIENT | CHEMIST [%] | WT (GMS) |
|---|---|---|
| Preferment Dextrose | 2.00 | 50 |
| Compressed yeas | 6.00 | 150 |
| Sucrose | 2.00 | 50 |
| DOUGH COMPOSITION TOTAL % | 100.00 | 2500 |

| Dough composition Conditioner Preblend | % Dough | WT (GMS) |
|---|---|---|
| DATEM w/amylas | 0.175 | 4.375 |
| Ascorbic Acid | 0.005 | 0.125 |
| Azodicarbonamide | 0.02 | 0.5 |
| SSL | 0.2 | 5 |

Procedures:

1) Liquid preferment: Combine preferment ingredients and let stand at room temp. for 60 minutes.

| Ingred. | (gm) |
|---|---|
| water | 596.75 |
| flour | 615.17 |
| yeast | 61.54 |
| dextrose | 50 |
| TOTAL | 1323.5 |

2) Combine formula minors, flour, glycerol, and ice with liquid preferment in a cold mixing bowl.

| Ingred. | (gm) | |
|---|---|---|
| Prefer. | 1323.5 | preferment above |
| flour | 560.83 | |
| yeast | 88.46 | |
| ice | 154.75 | |
| glycerol | 37.5 | |
| dextrose | 0 | |
| minors | 235 | remaining ingredients minus butter |
| TOTAL | 2400 | |

3) Mix at spd #1 for 60 sec, add butter (see step 2 below), mix at spd #1 for 60 sec, mix spd #2 for 8 minutes Peak BU's are 900 (+/−100)

| | (gm) | |
|---|---|---|
| Step 2 | 2400 | dough composition minus butter |
| Butter | 100 | |
| TOTAL | 2500 | |

4) Form into 100 gm dinner rolls; freeze and store rolls @ −10 F.

5) Bake frozen dinner rolls @ 375° F. for 35 minutes.

EXAMPLE

1. Sheet approximately 400 gm dough composition (described in Dinner Roll example) to 4 mm on a Rondo sheeter (Model Nr. STM 513).
2. Using a 6" diameter pan as a guide, cut out a circular piece of dough composition (weight of dough composition=175-200 gm).
3. Spray 6" pan with Vegalene (non-stick spray) prior to depositing and docking the dough.
4. Place dough/pan into a −10° F. freezer.

Sample 2

1. Sheet a 400 gm piece of dough composition to 2 mm.
2. Using a 6" diameter pan as a guide, cut out two circular pieces of dough composition (100 gm each).
3. Spray 6" pans with Vegalene (non-stick spray) prior to depositing and docking the dough composition samples.
4. Place both samples into a −10° F. freezer.

After 24 hours at −10° F., the pizza crust samples described above were topped with approximately 30-40 gm pizza sauce plus 50 gm mozzarella cheese. The samples were baked in a conventional oven at 425° F. for 20-25 minutes.

Data & Observations:

The pizza samples successfully leavened upon baking directly from the frozen state in 6" personal pan pizza baking pans. Crust was toast brown in color and possessed a tender texture.

The following examples are based on a Danish, one having transglutaminase and one without.

| FTO Danish Enzyme added | | |
|---|---|---|
| Ingredient | Percent % | |
| Yeast | 4 | |
| Sucrose | 3.67 | |
| Water | 23.6 | |
| Promax | 44.37 | |
| Victory | 3 | |
| Ice | 0.73 | |
| Eggs | 6 | |
| Salt | 0.731 | |
| Gluten | 3 | |
| Butter | 3 | |
| Replacer | 2 | |
| Mongly | 1 | |
| SSL | 0.25 | |
| Veron | 0.005 | Transglutaminase |
| AA | 0.003 | |
| Salp | 0.34 | |
| Soda | 0.34 | |
| TOTAL | 100.00 | |
| Roll-in | 15 | |

Coffee cake topping:
Butter, unsalted 24.6%
Cinnamon 2.2%
Salt 0.5%
Vanilla 0.2%
Step 1) Combine ingredients and mix smooth at low speed
Granulated sugar 43%
Promax 29.5%

Step 2) Add sugar and flour and mix at low speed until mixture becomes crumbly
Use cinnamon filling. Make filling 12-15% weight of dough.
Spread on uniformly, leaving top 1 inch border clean of filling roll coated dough pad into a log and cut to desired length.
Danish multipack: Apple filled pockets and cream cheese filled pockets; sweet rolls containing almond paste, snails topped with Bavarian creme.
This example shows the reworked product but without transglutaminase: BSV 2.4, which is not as high as samples containing transglutaminase.
FTO Danish with salp and soda added to addition of chem leavening.
Time 0 BSV=2.44
Accelerated shelf life=2.42

| Ingredients | % dough |
|---|---|
| Victory Flour | 41.24 |
| Rework | 12 |
| Liquid egg | 5.96 |
| Ice | 5.81 |
| Water | 13.29 |
| butter 34 | 3.28 |
| Yeast | 2.98 |
| Sugar | 5.36 |
| Gluten | 4.5 |
| NFDM (skim) | 2.38 |
| Mono/dig | 1.07 |
| Salt | 0.66 |
| Vanilla liquid | 0.6 |
| Cardamon | 0.18 |
| Ascorbic acid | 0.01 |
| low salp | 0.34 |
| Soda | 0.34 |
| | 100% |
| Lam. Butter | 16.43 |

Add all ingredients (except for butter, chem leaveners and yeast). Mix for 5 minutes
Add mix butter and leavening and mix for 5 minutes.
Target dough temp=15 C
36 layers with rest on conveyor

| Ingredients | % dough | no chem | (decrease salt by 30%) | |
|---|---|---|---|---|
| Victory Flour | 40.24 | 40.57 | 41.08 | 40.4 |
| Rework | 12 | 12 | 12 | 12 |
| Liquid egg | 5.96 | 5.96 | 5.96 | 5.96 |
| Ice | 5.81 | 5.81 | 5.81 | 5.81 |
| Water | 13.29 | 13.29 | 13.29 | 13.29 |
| butter 34 | 3.28 | 3.28 | 3.28 | 3.28 |
| Yeast | 3.98 | 3.98 | 3.98 | 3.98 |
| Sugar | 5.36 | 5.36 | 5.36 | 5.36 |
| Gluten | 4.5 | 4.5 | 4.5 | 4.5 |
| NFDM (skim) | 2.38 | 2.38 | 2.38 | 2.38 |
| Mono/dig | 1.07 | 1.07 | 1.07 | 1.07 |
| Salt | 0.66 | 0.33 | 0.5 | 0.5 |
| Vanilla liquid | 0.6 | 0.6 | 0.6 | 0.6 |
| Cardamon | 0.18 | 0.18 | 0.18 | 0.18 |
| Ascorbic acid | 0.01 | 0.01 | 0.01 | 0.01 |
| low salp | 0.34 | 0.34 | | 0.34 |
| Soda | 0.34 | 0.34 | | 0.34 |
| | 100% | 100% | 100% | 100% |
| Lam. Butter | 16.43 | 16.43 | 16.43 | 16.43 |

It will thus be seen according to the present invention a highly advantageous freezer to over dough has been provided. While the invention has been described in connection with what is presently considered to be the most practical and preferred embodiment, it will be apparent to those of ordinary skill in the art that the invention is not to be limited to the disclosed embodiment, that many modifications and equivalent arrangements may be made thereof within the scope of the invention, which scope is to be accorded the broadest interpretation of the appended claims so as to encompass all equivalent structures and products.

The inventors hereby state their intent to rely on the Doctrine of Equivalents to determine and assess the reasonably fair scope of their invention as it pertains to any apparatus, system, method or article not materially departing from but outside the literal scope of the invention as set out in the following claims.

The invention claimed is:

1. A dough composition made according to a method of preparing an unproofed dough composition capable of being frozen and baked without thawing to create a yeast-leavened baked dough product, the method comprising
   providing a set of ingredients including at least yeast, water, and flour,
   combining and processing the ingredients in combination with additional dough ingredients to produce a dough composition, the combining and processing including
   allowing a portion of the yeast to actively ferment a portion of the ingredients;
   developing the dough composition,
   generating bubbles in the developed dough composition, and
   providing non-metabolically active yeast in the developed dough composition wherein said non-metabolically active yeast is in a non-metabolically active state during frozen but become active for leavening during baking;
   wherein the combination of bubbles, developed dough composition, and non-metabolically active yeast, results in an unproofed dough composition capable of being frozen without partially baking, and baked without thawing, to create a yeast-leavened baked dough product.

2. The dough composition of claim 1, wherein the dough composition is frozen, and packaged in a non-modified atmosphere package.

3. A dough composition made according to a method of making an unproofed dough composition, the method comprising:
   providing a metabolized dough portion comprising metabolically-active yeast,
   bubbles, and developed dough matrix, and
   combining the metabolized dough portion with additional dough ingredients including non-metabolically active yeast, to form a dough composition that contains bubbles in developed dough matrix, and that contains non-metabolically active yeast, wherein said non-metabolically active yeast is in a non-metabolically active state during frozen but become active for leavening during baking
   wherein the unproofed dough composition can be frozen and baked without thawing or proofing to produce a yeast-leavened baked dough product.

* * * * *